March 2, 1948.  W. B. HOWARD  2,437,029
COLLAPSIBLE SHOPPING CART
Filed Jan. 12, 1946　　2 Sheets-Sheet 1
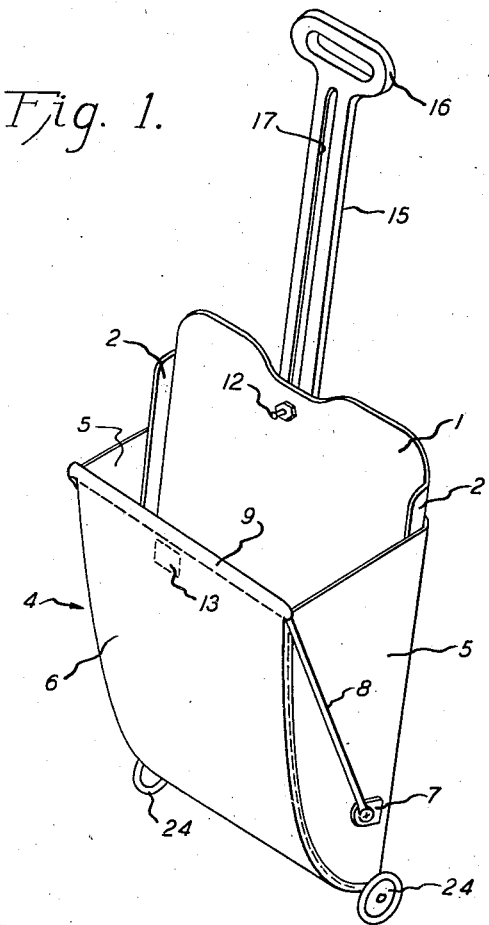
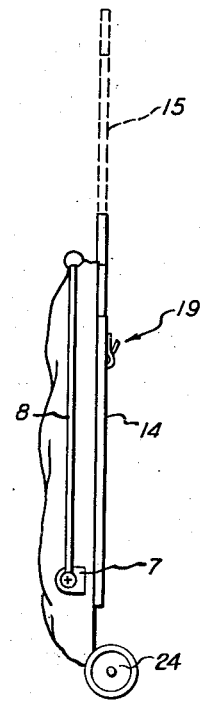
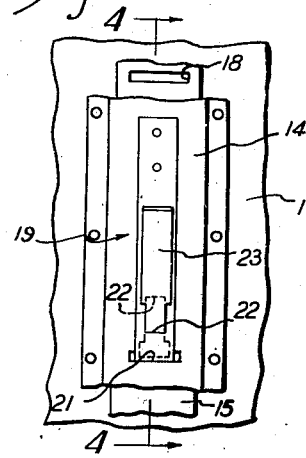
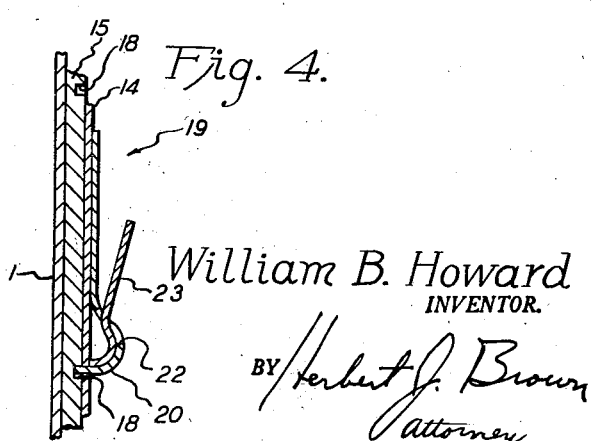
William B. Howard
INVENTOR.
BY Herbert J. Brown
Attorney William B. Howard
INVENTOR.

Patented Mar. 2, 1948

2,437,029

UNITED STATES PATENT OFFICE 2,437,029

COLLAPSIBLE SHOPPING CART

William B. Howard, La Jolla, Calif.

Application January 12, 1946, Serial No. 640,845

1 Claim. (Cl. 280—36)

This invention relates to carriers and has particular reference to improvements in shopping carts.

An object of the invention is to provide a shopping cart which is not only collapsible and convenient to carry when not used as a cart, but one which is exceptionally light for its size.

Another object of the invention is to provide a retractable handle having an inexpensive and novel latch forming a part thereof.

A further object of the invention is to provide means on a cart of the described class whereby the same may be connected with another push vehicle, such as a baby carriage.

These and other objects will become apparent from the following description of the accompanying drawings, wherein:

Figure 1 is a perspective view of a shopping cart embodying the present invention.

Figure 2 is a side elevational view of the cart illustrated in Figure 1, but showing the same in its collapsed or retracted position.

Figure 3 is an elevational view of a portion of the back of the cart, and particularly showing the arrangement and location of the latch mechanism.

Figure 4 is a vertical sectional view of the latch shown in Figure 3.

Figure 5 is a back elevational view of the cart and showing the location of folding hooks thereon for attaching the cart to a baby carriage or the like.

Figure 6:
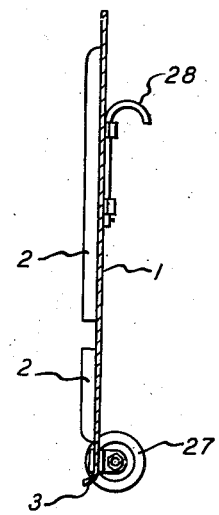
Figure 6 is a vertical sectional view taken on lines 6—6 of Figure 5 and showing one of the hooks in its extended position.

The cart shown includes a sheet metal back 1, having forwardly flanged edges 2 along each side, and a forwardly flanged lower edge 3 as shown in Figures 1 and 6. The cart also includes a bag 4 of fabric or other flexible material and having substantially triangular ends 5, the lower ends of which are preferably curved. The bag also includes a rectangular front to which is sewed to the ends 5. Forwardly disposed brackets 7 are attached to the sides of the back 1 and pivotally engage the ends of an inverted U-shaped rod 8 which is positioned through the hem 9 of the upper end of the rectangular portion 6 of the said bag.

Figure 8:
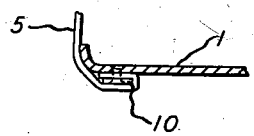
Figure 8 is a sectional view taken on lines 8—8 of Figure 5 and showing the arrangement used for attaching the bag of the cart to the back or frame member.

As particularly shown in Figure 8, the end portions 5 of the bag 4 are secured to the back 1 by means of riveted vertical strips of metal 10. The edges of the bag ends 5 are positioned under the strip 10 from where they are directed toward the center of the cart, around the inner edge of the strip 10, and thence over the said strip and toward the front of the cart. Similarly, the bottom edge of the bag front 6 is secured by means of a horizontal strip 11, shown by dotted lines in Figure 5, which strip is also riveted in place.

Near the upper front central portion of the back 1 there is a projecting fastener stud 12, which engages a fastener snap 13 sewed or otherwise attached to a corresponding area inside of the bag front 6. The thus far described arrangement provides for foldable bag 4 which may be opened or closed as desired, and when closed detachably secured by the fastener parts 12 and 13.

A vertical channel 14 is secured to the center of the back 1, as by riveting, and slidably receives therein an elongated flat handle 15 having a grip 16 at its upper end. It will be noted in Figure 1 that the handle 15 is provided with a groove 17 in its face to accommodate the rearwardly extending portion (not shown) of the fastener stud 12.

As shown in Figures 3 and 4, the rear surface of the handle 15 is provided with spaced lateral grooves 18 for engagement with a latch assembly 19 whereby the handle 15 may be adjusted and secured at various extended lengths.

The latch 19 is secured to the longitudinal center of the channel 14 and is comprised of a hook-shaped spring member 20, the curved end of which extends inwardly through an opening 21 in the said channel where it normally engages one of the lateral grooves 18. The arcuate portion of the hook-shaped member 19 has a rectangular opening 22 to receive a hook-shaped lever member 23 therethrough. The arcuate end of the last referred to member 23 is received within the arc of the first member 19, whereas the extended portion of the said lever member rests on one edge of the opening 22. It will be noted in Figure 3 that the lever member 23 is T-shaped at its arcuate end whereby the same is retained within the arc of the larger member 19. By this arrangement the fastener may be assembled by turning the lever member 23, inserting the arcuate end of the same through the opening 22, and by then arranging the lengths of the two members 19 and 23. It will also be noted that the extending portion of the lever member 23 projects outwardly at an angle with respect to the larger member 19. By pressing the extending portion of the lever member 23, the arcuate end of the latch member 20 is moved to disengage any of the lateral grooves 18, allowing the handle 15 to be manually extended or retracted. As will be noted in Figures 2 and 5, the lever grip 16 may be positioned close to the upper edge of the back 1 for conveniently carrying the cart by hand when it is either empty or full.

Figure 5:
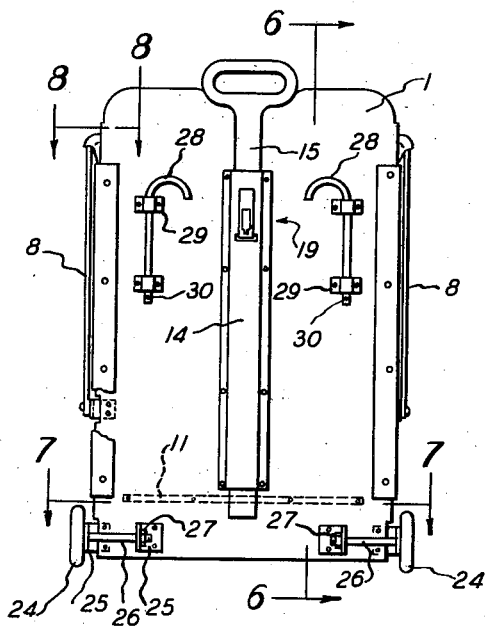
Figure 7:
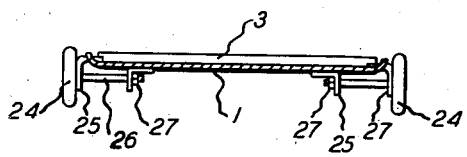
Figure 7 is a sectional view taken on lines 7—7 of Figure 5 and showing the arrangement for mounting the wheels.

Reference is now made to Figures 5, 6 and 7 wherein details for mounting the wheels 24 are shown. On each side of the lower end of the back 1 there are pairs of spaced brackets 25 which have their flanges extending rearwardly of the said back. Bolts 26, on which the wheels are mounted, extend through the flanges of the brackets 25 and are secured at their inner ends by nuts 27. The last described arrangement makes for relatively light weight construction.

Above the lateral center of the back 1, and parallel to the length of the handle 15, foldable hooks 28 are mounted on each side of the channel 14 for attaching the present cart to a baby carriage, child's wagon, or the like (not shown). The hooks 28 are secured for limited rotation by means of clevises riveted or otherwise secured to the back 1, and the said hooks are secured against longitudinal displacement by projecting pins 30 at their lower ends, and by the curved shape of the said hooks at their upper ends. The clevises 29 engage the hooks 28 tightly so as to provide frictional engagement and cause the said hooks to remain as manually positioned.

Generally, the described shopping cart is convenient to handle by reason of the foldable bag 4 and retractable handle 15. The described hooks add to the cart's utility. The described construction is relatively light and strong by reason of the described wheel mountings 25 and 26 and the flanged side and bottom edges 2 and 3.

What is claimed is:

In a shopping cart the combination of a back of sheet material, wheels mounted on the said back at the lower end thereof, a vertically disposed channel secured to the said back, a slidable handle positioned within the said channel, lateral grooves in the said handle, an opening in the back of the said channel for registering with the said grooves, and a spring actuated latch for extending through the said opening and engaging any of the said grooves.

WILLIAM B. HOWARD.

REFERENCES CITED

The following references are of record in the file of this patent:

UNITED STATES PATENTS

| Number | Name | Date |
|---|---|---|
| 1,819,601 | Hiatt | Aug. 18, 1931 |
| 2,374,278 | Fuerstenberg | Apr. 24, 1945 |
| 1,276,322 | Bullock | Aug. 20, 1918 |
| 1,635,423 | Lapham | July 12, 1927 |
| 2,364,246 | Shaver et al. | Dec. 5, 1944 |
| D. 115,352 | Scudder | June 20, 1939 |

FOREIGN PATENTS

| Number | Country | Date |
|---|---|---|
| 711,933 | France | Sept. 21, 1931 |